(12) United States Patent
Seike

(10) Patent No.: US 10,065,494 B2
(45) Date of Patent: Sep. 4, 2018

(54) COOLING APPARATUS FOR VEHICLE

(71) Applicant: TOYOTA JIDOSHA KABUSHIKI KAISHA, Toyota-shi, Aichi-ken (JP)

(72) Inventor: Tsuyoshi Seike, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/633,005

(22) Filed: Jun. 26, 2017

(65) Prior Publication Data
US 2018/0050585 A1    Feb. 22, 2018

(30) Foreign Application Priority Data
Aug. 17, 2016 (JP) ................................ 2016-160196

(51) Int. Cl.
| | | |
|---|---|---|
| *F01P 11/02* | (2006.01) | |
| *B60K 11/02* | (2006.01) | |
| *B60K 11/06* | (2006.01) | |
| *F04B 17/03* | (2006.01) | |
| *F04D 13/02* | (2006.01) | |
| *F04B 9/04* | (2006.01) | |

(Continued)

(52) U.S. Cl.
CPC .............. *B60K 11/02* (2013.01); *B60K 11/06* (2013.01); *F01P 11/02* (2013.01); *F01P 11/029* (2013.01); *F04B 9/045* (2013.01); *F04B 17/03* (2013.01); *F04B 17/05* (2013.01); *F04B 49/065* (2013.01); *F04D 13/02* (2013.01)

(58) Field of Classification Search
CPC ......... B60K 11/02; B60K 11/06; F04D 13/02; F04B 17/03; F01P 11/02; F01P 2011/0233; F01P 11/028; F01P 11/0285; F01P 11/029
See application file for complete search history.

(56) References Cited

U.S. PATENT DOCUMENTS 4,480,598 A * 11/1984 Berrigan ................. F01P 11/029
                                                    123/41.27
4,608,827 A *  9/1986 Hasegawa ................. F01P 3/12
                                                    123/41.31
(Continued)

FOREIGN PATENT DOCUMENTS

| JP | H10-266856 A | 10/1998 |
|---|---|---|
| JP | 2011-009248 A | 1/2011 |
| JP | 2012-145004 A | 8/2012 |

(Continued)

*Primary Examiner* — Jacob Amick
(74) *Attorney, Agent, or Firm* — Oliff PLC

(57) ABSTRACT

The interior of the first reservoir is open to the atmospheric air. A first liquid retaining portion and a first air retaining portion are provided in the first reservoir. The interior of the second reservoir is sealed. A second liquid retaining portion and a second air retaining portion are provided in the second reservoir. A communicating portion allows communication between the second air retaining portion and the first liquid retaining portion. The opening of the communicating portion in the first liquid retaining portion is located lower than a minimum water level of the first liquid retaining portion. The opening of the communicating portion in the second air retaining portion is located higher than a maximum water level of the first liquid retaining portion.

5 Claims, 7 Drawing Sheets

(51) Int. Cl.
*F04B 17/05* (2006.01)
*F04B 49/06* (2006.01)

(56) References Cited

U.S. PATENT DOCUMENTS

2011/0284107 A1* 11/2011 Ciak ................ F01P 11/029
                                                                              137/563
2016/0164378 A1* 6/2016 Gauthier ............ H02K 1/32
                                                                              310/54

FOREIGN PATENT DOCUMENTS

| JP | 2014-073803 A | 4/2014 |
| JP | 2017-082675 A | 5/2017 |

* cited by examiner

COOLING APPARATUS FOR VEHICLE

BACKGROUND OF THE INVENTION

The present invention relates to a cooling apparatus for a vehicle.

Japanese Laid-Open Patent Publication No. 10-266856 discloses a cooling apparatus for a vehicle including two cooling circuits. The cooling apparatus has a reservoir retaining coolant water, which is provided in common for the two cooling circuits. The reservoir has a pressure valve for regulating the pressure in the reservoir. The reservoir also has a partition plate, which restrains mixing, in the reservoir, of the coolant water circulating in one of the cooling circuits with the coolant water circulating in the other.

When the pressure valve of the reservoir is open, atmospheric air flows into the reservoir. At this time, foreign matter, which is contained in the atmospheric air, enters the reservoir. Although the reservoir described in the aforementioned document includes the partition wall, which separates the coolant water, the coolant water in the two systems, which are separated by the partition wall, is exposed to the air in the reservoir. As a result, the coolant water in the systems may incorporate foreign matter in the atmospheric air that has entered the reservoir.

SUMMARY OF THE INVENTION

Accordingly, it is an objective of the present invention to provide a cooling apparatus for a vehicle capable of restraining incorporation of foreign matter contained in atmospheric air into one or more of multiple cooling circuits.

To achieve the foregoing objective and in accordance with a first aspect of the present invention, a cooling apparatus is provided that is used in a vehicle having a first cooling circuit and a second cooling circuit each allowing independent circulation of coolant water. The apparatus includes a first reservoir arranged in the first cooling circuit, a second reservoir arranged in the second cooling circuit, and a communicating portion. An interior of the first reservoir is open to atmospheric air. A first liquid retaining portion that retains coolant water and a first air retaining portion arranged above the first liquid retaining portion are provided in the first reservoir. An interior of the second reservoir is sealed. A second liquid retaining portion that retains the coolant water and a second air retaining portion arranged above the second liquid retaining portion are provided in the second reservoir. The communicating portion allows communication between the second air retaining portion and the first liquid retaining portion. An opening of the communicating portion in the first liquid retaining portion is located lower than a minimum water level of the first liquid retaining portion. An opening of the communicating portion in the second air retaining portion is located higher than a maximum water level of the first liquid retaining portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A cooling apparatus 10 for a vehicle according to one embodiment will now be described with reference to FIGS. 1 to 7. The cooling apparatus 10 of the present embodiment is mounted in a hybrid vehicle including two drive sources, which are an internal combustion engine and a motor.

Figure 1:
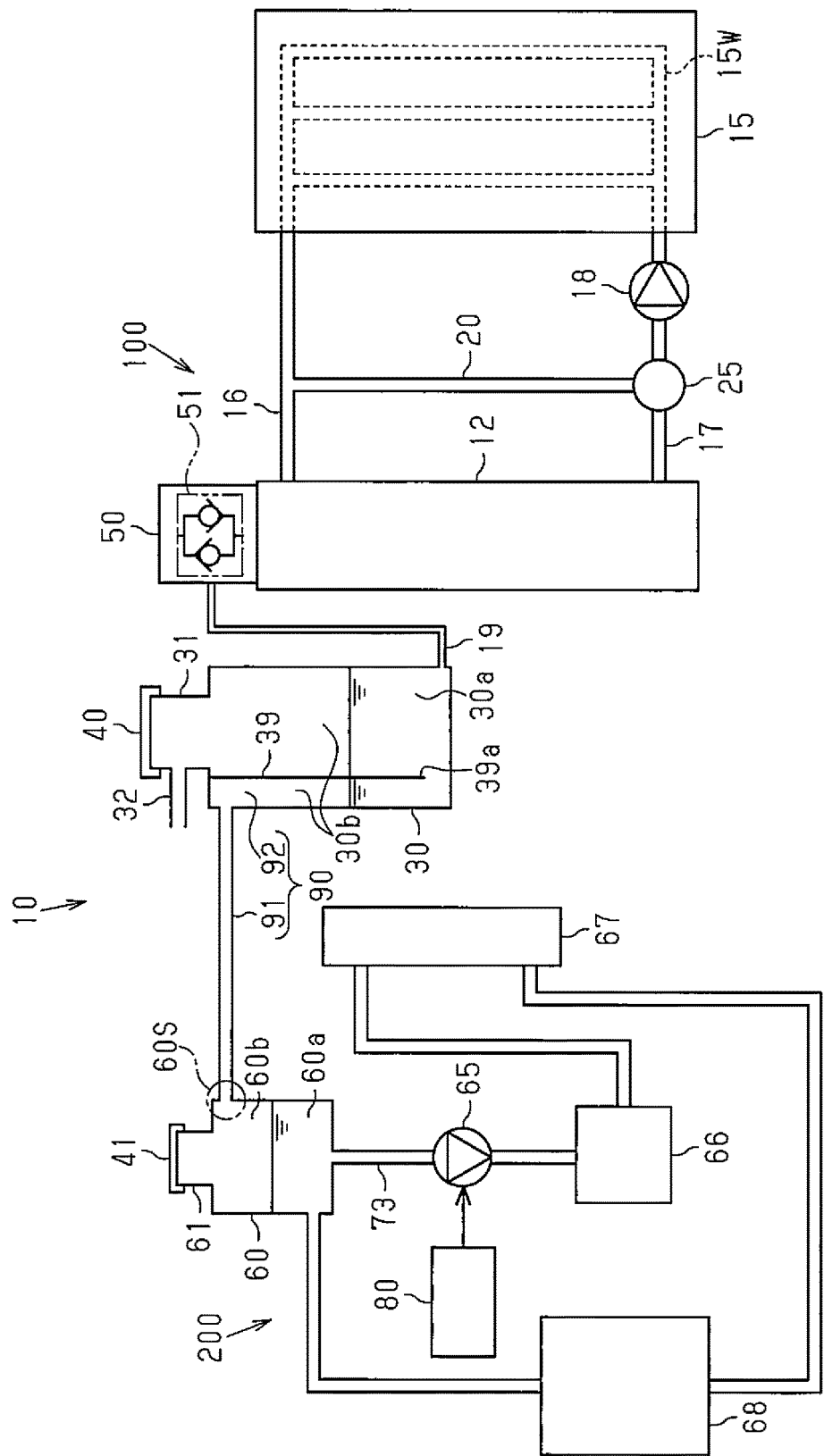
FIG. 1 is a diagram illustrating the configuration of a cooling apparatus for a vehicle according to one embodiment of the present invention.

As shown in FIG. 1, the cooling apparatus 10 includes two independent first and second cooling circuits 100 and 200. The first cooling circuit 100 cools an internal combustion engine 15 with coolant water. The second cooling circuit 200 cools components generating a small amount of heat compared to the engine 15, such as a transaxle 66 of the vehicle or an inverter 68, which supplies electric power to the motor, which serves as a drive source of the vehicle, with coolant water.

A first radiator 12, which is a heat exchanger, is arranged in the first cooling circuit 100. An opening, through which coolant water is poured into the first radiator 12, is provided in the uppermost section of the first radiator 12. A radiator cap 50, which includes a pressure regulating valve 51, is attached to the opening of the first radiator 12. The pressure regulating valve 51 is configured by a positive pressure valve and a negative pressure valve. The positive pressure valve opens when the pressure in the first cooling circuit 100 is greater than or equal to a predetermined pressure, which is higher than the atmospheric pressure. The negative pressure valve opens when the pressure in the first cooling circuit 100 is lower than the atmospheric pressure.

A water jacket 15W is provided in the cylinder block and the cylinder head of the engine 15. A coolant water outlet port of the water jacket 15W and a coolant water inlet port of the first radiator 12 are connected to each other through a first passage 16. A coolant water inlet port of the water jacket 15W and a coolant water outlet port of the first radiator 12 are connected to each other through a second passage 17, A mechanically driven first water pump 18 is arranged on the path of the second passage 17. A rotary shaft of the first water pump 18 is connected to a crankshaft of the engine 15. The first water pump 18 is driven through rotation of the crankshaft.

A branch passage 20, which is branched from the first passage 16, is arranged in the first cooling circuit 100. The branch passage 20 is connected to a section of the second passage 17 between the coolant water outlet port of the first radiator 12 and the first water pump 18. A thermostat 25 is arranged in a connecting portion between the branch passage 20 and the second passage 17. The thermostat 25 is a temperature-sensitive control valve in which the opening degree of a valve body arranged in the thermostat 25 changes in correspondence with the temperature of the coolant water. When the temperature of the coolant water is low, the thermostat 25 circulates the coolant water such that the coolant water that has flowed out of the water jacket 15W flows in the branch passage 20, not the first radiator 12. In contrast, when the temperature of the coolant water is high, the thermostat 25 circulates the coolant water such that the coolant water that has flowed out of the water jacket 15W flows in the first radiator 12, not the branch passage 20.

A first reservoir 30, which retains coolant water, is arranged in the first cooling circuit 100. The first reservoir 30 is a substantially quadrangular prism-like body. A first liquid retaining portion 30a, which retains coolant water, and a first air retaining portion 30b, which is located above the first liquid retaining portion 30a, are provided in the first reservoir 30. A partition wall 39, which divides the interior of the first reservoir 30, is arranged in the first reservoir 30.

A filling portion 31, which has an opening through which the first reservoir 30 is replenished with coolant water, is arranged in the uppermost section of the first reservoir 30. A detachable cap 40 is attached to the opening of the filling portion 31. An atmospheric air opening passage 32, which has a terminal end open to the atmospheric air, is arranged in the filling portion 31. The interior of the first reservoir 30 is constantly open to the atmospheric air through the atmospheric air opening passage 32.

The first liquid retaining portion 30a of the first reservoir 30 and the radiator cap 50 are connected to each other through a communication line 19. As the temperature of the coolant water in the first cooling circuit 100 is increased and thus the coolant water expands, the pressure in the first cooling circuit 100 increases. When the pressure in the first cooling circuit 100 increases to the predetermined pressure, the positive pressure valve of the radiator cap 50 becomes open. This discharges some of the coolant water in the first cooling circuit 100 into the first reservoir 30 via the radiator cap 50 and the communication line 19. When the coolant water is discharged into the first reservoir 30, bubbles are discharged from the first cooling circuit 100, together with the coolant water, into the first reservoir 30. In contrast, as the temperature of the coolant water in the first cooling circuit 100 is reduced and thus the coolant water contracts, the pressure in the first cooling circuit 100 decreases. When the pressure in the first cooling circuit 100 becomes lower than the atmospheric pressure, the negative pressure valve of the radiator cap 50 becomes open. This draws some of the coolant water retained in the first reservoir 30 into the first cooling circuit 100 via the communication line 19 and the radiator cap 50.

The second cooling circuit 200 includes a looped third passage 73. The coolant water circulating in the third passage 73 is independent from the coolant water circulating in the first cooling circuit 100. The third passage 73 connects a second reservoir 60, which retains coolant water, an electric second water pump 65, a transaxle 66, a second radiator 67, which is a heat exchanger, and an inverter 68 in series.

A control unit 80 is configured by a microcomputer, a memory, a driver circuit, and the like. The control unit 80 controls the displacement of the second water pump 65. The second reservoir 60 is a substantially quadrangular prism-like body. A second liquid retaining portion 60a, which retains coolant water, and a second air retaining portion 60b, which is located above the second liquid retaining portion 60a, are provided in the second reservoir 60. The second liquid retaining portion 60a is connected to the third passage 73.

A filling portion 61, which has an opening through which the second reservoir 60 is replenished with coolant water, is arranged in an uppermost section of the second reservoir 60. A detachable cap 41 is attached to the opening of the filling portion 61. The cap 41 seals the second reservoir 60.

The second cooling circuit 200 is configured such that the coolant water discharged from the second water pump 65 flows through the transaxle 66, the second radiator 67, the inverter 68, and the second reservoir 60 sequentially in this order and then returns to the second water pump 65. At the time of flowing back in the second cooling circuit 200, the coolant water always passes through the second reservoir 60. When the coolant water passes through the second reservoir 60, the bubbles in the second cooling circuit 200 are separated from the coolant water. Since the coolant water always passes through the second reservoir 60 at the time of flowing back, as has been described, bubbles are constantly separated from the coolant water.

The cooling apparatus 10 has a communicating portion 90, which allows communication between the second air retaining portion 60b of the second reservoir 60 and the first liquid retaining portion 30a of the first reservoir 30. The communicating portion 90 has a communication pipe 91 and a partition wall 39. The communication pipe 91 is connected to an upper section of a side wall of the second reservoir 60 and thus communicates with the second air retaining portion 60b. The partition wall 39 divides the interior of the first reservoir 30 to define a compartment 92.

Figure 2:
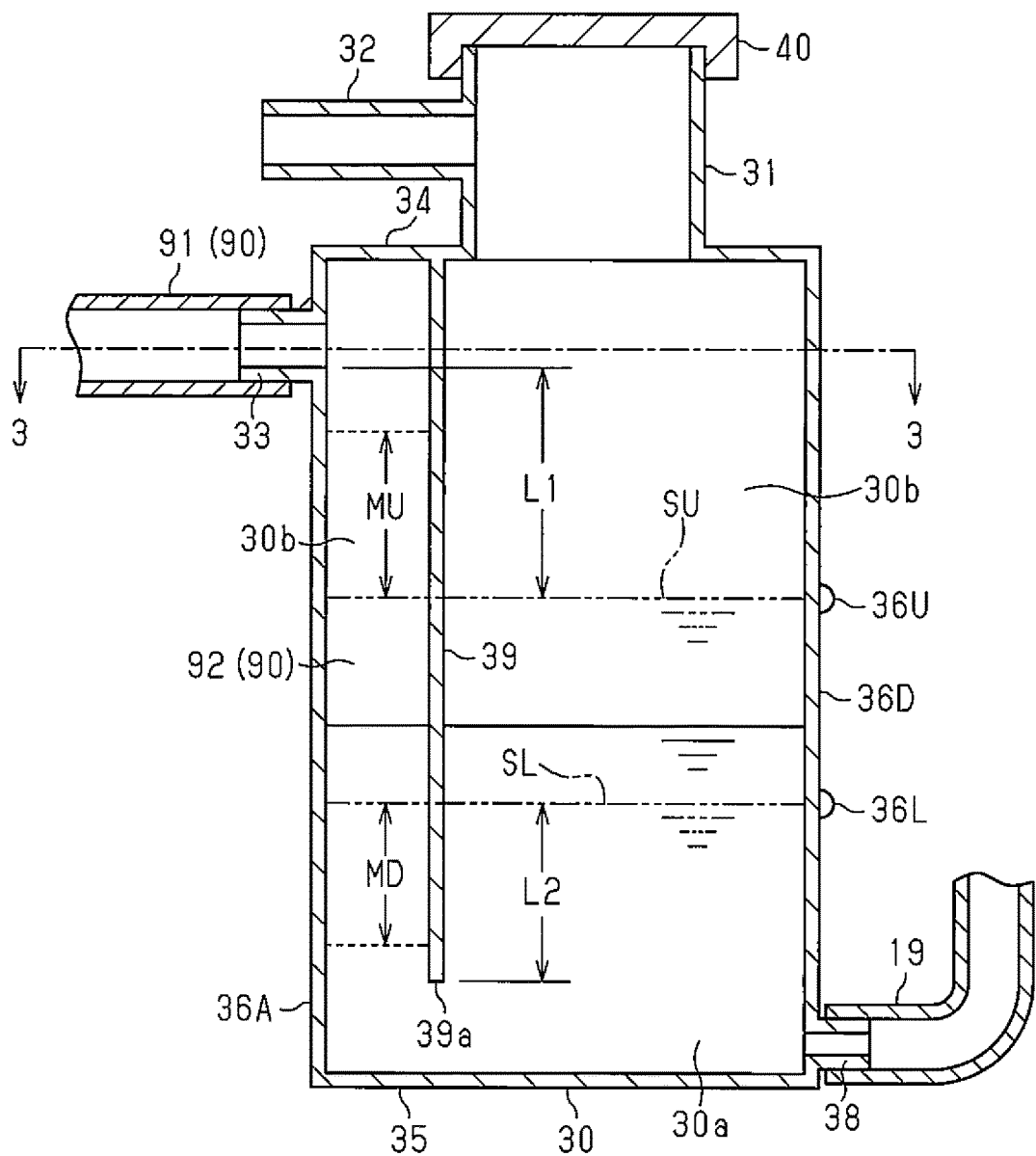
FIG. 2 is a cross-sectional view showing a first reservoir.
Figure 3:
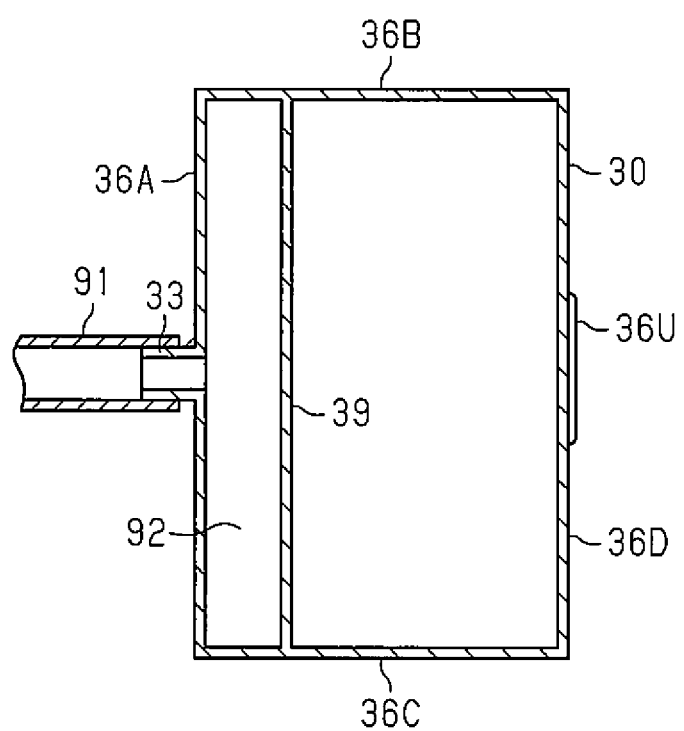
FIG. 3 is a cross-sectional view taken along line 3-3 of FIG. 2.

With reference to FIGS. 2 and 3, the first reservoir 30 has an upper wall 34, a bottom wall 35, which is opposed to the upper wall 34, and four side walls connected to the upper wall 34 and the bottom wall 35. Hereinafter, one of the four side walls will be referred to as a first side wall 36A. Two of the side walls adjacent to the first side wall 36A will be referred to as a second side wall 36B and a third side wall 36C. The one of the side walls opposed to the first side wall 36A will be referred to as a fourth side wall 36D.

As illustrated in FIG. 2, a substantially cylindrical connecting portion 33 is arranged in the upper section of the first side wall 36A of the first reservoir 30. The connecting portion 33 opens in the first air retaining portion 30b. The communication pipe 91 is connected to the connecting portion 33.

The fourth side wall 36D has an upper limit mark 36U, which represents the upper limit of the retaining amount of coolant water in the first reservoir 30, and a lower limit mark 36L, which represents the lower limit of the retaining amount of coolant water. Hereinafter, a maximum water level SU of the first liquid retaining portion 30a is defined as the water level when the amount of coolant water corresponds to the amount represented by the upper limit mark 36U in a state in which the coolant water temperature in the first liquid retaining portion 30a is approximately 20° C. and the pressure in the first air retaining portion 30b in the compartment 92, which will be described later, is the atmospheric pressure. Also, a minimum water level SL of the first liquid retaining portion 30a is defined as the level of coolant water in the first liquid retaining portion 30a when the coolant water amount corresponds to the amount represented by the lower limit mark 36L in a state in which the coolant water temperature in the first liquid retaining portion 30a is approximately 20° C. and the pressure in the first air retaining portion 30b in the compartment 92 is the atmospheric pressure.

A substantially cylindrical connecting portion 38 is arranged in a lower section of the fourth side wall 36D in the vicinity of the bottom wall 35. The connecting portion 38 opens to the first liquid retaining portion 30a. The communication line 19 is connected to the connecting portion 38.

The partition wall 39 is shaped like a plate and opposed to the first side wall 36A. The partition wall 39 extends downward from the upper wall 34 of the first reservoir 30. A lowermost end 39a of the partition wall 39 extends to a position that is lower than the minimum water level SL of the first liquid retaining portion 30a and is spaced from the bottom wall S. The lowermost end 39a of the partition wall 39 is an opening of the communicating portion 90 in the first liquid retaining portion 30a.

Referring to FIG. 3, the partition wall 39, which extends along the first side wall 36A, is connected to both the second side wall 36B and the rd side wall 36C. This forms the compartment 92, which is surrounded by the first side wall 36A, the second side wall 36B, the third side wall 36C, the upper wall 34, and the partition wall 39, in the first reservoir 30. The connecting portion 33 communicates with the compartment 92. The compartment 92 configures a section of the communicating portion 90 provided in the first reservoir 30. The compartment 92 has a passage cross section parallel to the coolant water surface and a cross-sectional area greater than the cross-sectional area of the communication pipe 91.

As has been described, the lowermost 39a of the partition wall 39 is spaced from the bottom wall 35. As a result, the interior of the compartment 92 and the exterior of the compartment 92 are connected to each other in the vicinity of the bottom surface of the first reservoir 30.

As shown in FIG. 1, a passage end section 60S of the communication pipe 91, which is connected to the second reservoir 60, is arranged higher than the maximum water level SU of the first liquid retaining portion 30a. That is, the opening of the communicating portion 90 in the second air retaining' portion 60b is arranged higher than the maximum water level SU of the first liquid retaining portion 30a.

Figure 4:
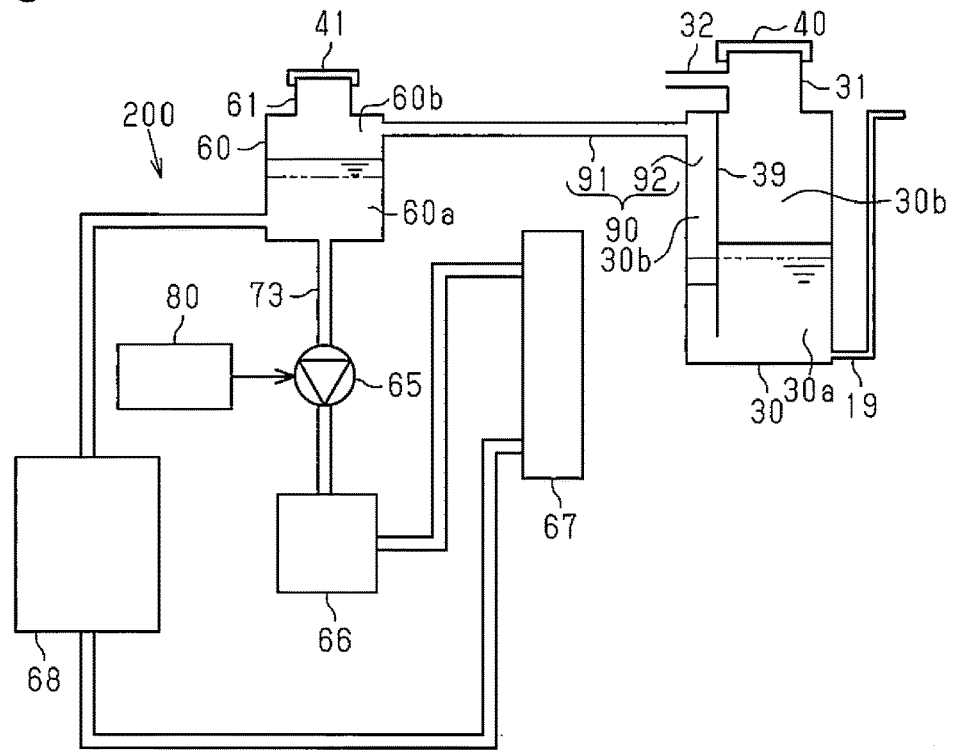
FIG. 4 is a diagram illustrating the coolant water surfaces in reservoirs when the temperature of the coolant water in a second reservoir is increased.
Figure 5:
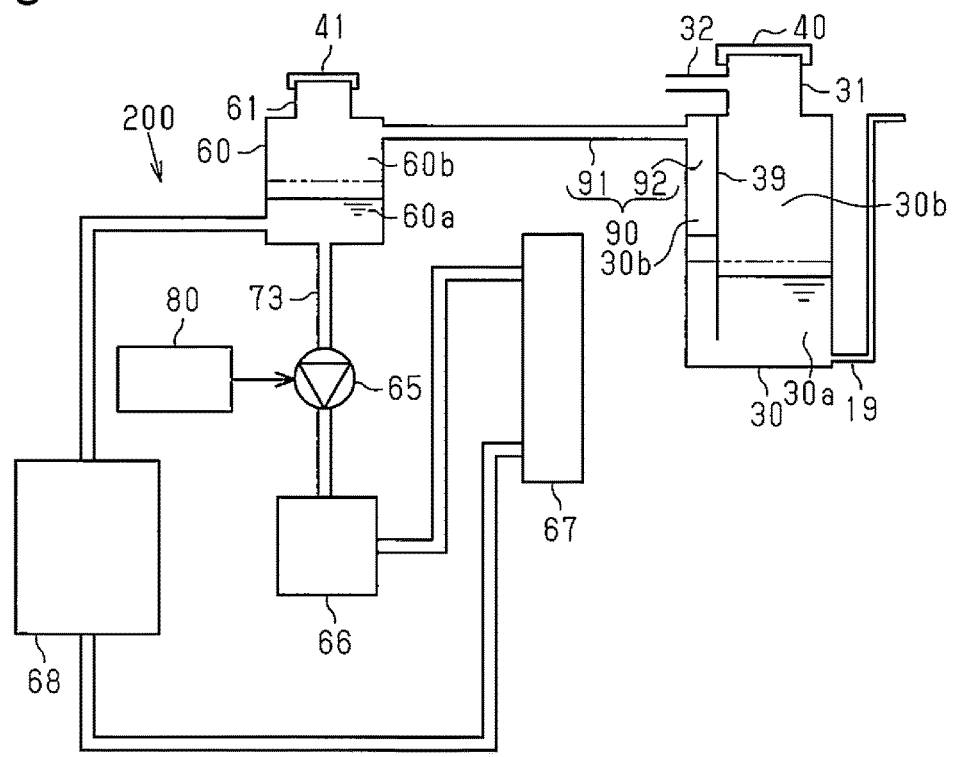
FIG. 5 is a diagram illustrating the coolant water surfaces in the reservoirs when the temperature of the coolant water in the second reservoir is reduced.

FIG. 4 shows the state of the interior of the first reservoir 30 and the state of the interior of the second reservoir 60 at the time the temperature of the coolant water in the second cooling circuit 200 is increased. FIG. 5 shows the state of the interior of the first reservoir 30 and the state of the interior of the second reservoir 60 at the time the temperature of the coolant water in the second cooling circuit 200 is reduced. In FIGS. 4 and 5 and FIGS. 6 and 7, which will be described later, the coolant water surface at the time the coolant water temperature is approximately 20° C. is represented by the long dashed double-short dashed lines.

As illustrated in FIG. 4, as the temperature of the coolant water in the second cooling circuit 200 is increased and the coolant water thus expands, the coolant water surface in the second reservoir 60 ascends. The air in the second air retaining portion 60b of the second reservoir 60 is thus pressed out into the communicating portion 90. In this state, force depressing the coolant water surface acts in the compartment 92. As has been described, the interior of the compartment 92 and the exterior of the compartment 92 are connected to each other in the vicinity of the bottom surface of the first reservoir 30. The interior of the first reservoir 30 is open to the atmospheric air. This facilitates depression of the coolant water surface in the compartment 92. Correspondingly, the coolant water surface in the exterior of the compartment 92 in the first reservoir 30 ascends.

Referring to FIG. 5, as the temperature of the coolant water in the second cooling circuit 200 is reduced and the coolant water thus contracts, the coolant water surface in the second reservoir 60 descends. This draws air from the communicating portion 90 into the second air retaining portion 60b of the second reservoir 60. In this state, force drawing the coolant water surface upward acts in the compartment 92. As has been described, the interior of the compartment 92 and the exterior of the compartment 92 are connected to each other in the vicinity of the bottom surface of the first reservoir 30. The interior of the first reservoir 30 is open to the atmospheric air. This facilitates ascent of the coolant water surface in the compartment 92. Correspondingly, the coolant water surface in the exterior of the compartment 92 in the first reservoir 30 descends. As has been described, the coolant water surface in the compartment 92 selectively descends and ascends in correspondence with change of the coolant water temperature in the second cooling circuit 200.

As has been described, the interior of the first reservoir 30 is open to the atmospheric air. The coolant water in the first reservoir 30 thus tends to incorporate foreign matter in the atmospheric air. Therefore, entry of the coolant water in the first reservoir 30, which tends to incorporate foreign matter, through the compartment 92 and the communication pipe 91 with respect to the second reservoir 60 must be avoided. For this purpose, the position of the connecting portion 33 and the position of the lowermost end 39a of the partition wall 39 are set in the manners described below.

Specifically, the maximum ascent amount of the coolant water surface in the compartment 92 with reference to the maximum water level SU is defined as the maximum ascent amount MU. The vertical distance from the maximum water level SU to the opening of the connecting portion 33 is defined as the distance L1. The position of the connecting portion 33 is set to satisfy the expression the distance L1>the maximum ascent amount MU. This restrains flow of the coolant water from the compartment 92 into the communication pipe 91, even when the temperature of the coolant water in the second cooling circuit 200 is reduced and the coolant water surface in the compartment 92 ascends maximally.

Figure 6:
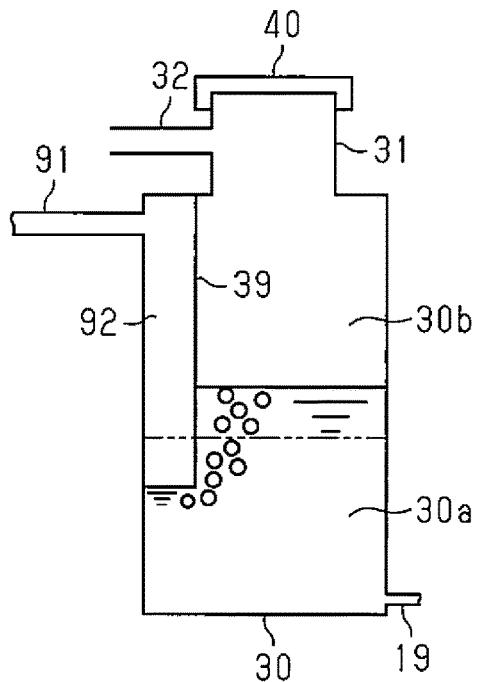
FIG. 6 is a cross-sectional view of the first reservoir, illustrating a state of the coolant water surface in the first reservoir.
Figure 7:
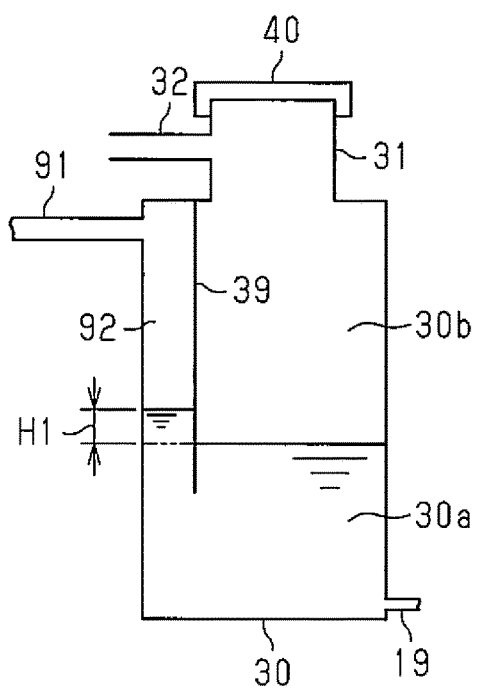
FIG. 7 is a cross-sectional view of the first reservoir, illustrating another state of the coolant water surface in the first reservoir.

On the other hand, as illustrated in FIG. 6, there may be a case in which the temperature of the coolant water in the second cooling circuit 200 is increased and the coolant water surface in the compartment 92 descends to the lowermost end 39a of the partition wall 39. In this case, the compartment 92 is completely filled with air and free from coolant water. If the air pressure in the compartment 92 increases further in this state, some of the air in the compartment 92 is transformed into bubbles and incorporated in the coolant water in the first reservoir 30. Thereafter, the air escapes to the section of the first air retaining portion 30b that is located in the exterior of the compartment 92. In this state, the pressure of the air in the compartment 92 is lower than before the air escapes. That is, when the temperature of the coolant water in the second cooling circuit 200 is increased and then reduced to the temperature before the temperature increase, the pressure in the compartment 92 is low compared to before the temperature increase. As a result, as illustrated in FIG. 7, when the temperature of the coolant water in the second cooling circuit 200 is reduced to the temperature before heating, the coolant water surface in the compartment 92 is higher than the coolant water surface before the temperature increase by a specific margin H1. Therefore, in this case, when the temperature of the coolant water in the second cooling circuit 200 is reduced and the coolant water surface in the compartment 92 correspondingly ascends, the coolant water in the compartment 92 is likely to reach the connecting portion 33. As a result, the coolant water in the first reservoir 30 is likely to enter the second reservoir 60.

To prevent this disadvantage, the coolant water needs to be maintained in the compartment 92 in the communicating portion 90 even when the coolant water surface in the compartment 92 maximally descends. That is, the coolant water surface needs to be prohibited from reaching the lowermost end 39a of the partition wall 39. Specifically, the maximum descent amount of the coolant water surface in the compartment 92 with reference to the lowermost water level SL is defined as the maximum descent amount MD. The vertical distance from the lowermost water level SL to the lowermost end 39a of the partition wall 39 is defined as the distance L2. The distance from the lowermost water level SL to the lowermost end 39a of the partition wall 39 is set to satisfy the expression "the distance L2>the maximum descent amount MD".

The present embodiment achieves the following advantages.

(1) As shown in FIG. 1, the communicating portion 90 allows communication between the second air retaining portion 60b of the second reservoir 60 and the first liquid retaining portion 30a of the first reservoir 30. The opening of the communicating portion 90 in the first liquid retaining portion 30a is located lower than the minimum water level SL of the first liquid retaining portion 30a. The section of the communicating portion 90 in the vicinity of the opening is thus filled with the coolant water of the first reservoir 30. As a result, the interior of the second reservoir 60, to which the communicating portion 90 is connected, is blocked from the atmospheric air by the coolant water of the first reservoir 30. This restrains incorporation of foreign matter in the atmospheric air in the coolant water of the second cooling circuit 200 through the second reservoir 60, thus restraining incorporation of foreign matter in the atmospheric air in one of the two cooling circuits. Also, since the interior of the second reservoir 60 is blocked from the atmospheric air, decrease of the coolant water in the second reservoir 60 through evaporation is restrained.

In contrast, the interior of the first reservoir 30 is open to the atmospheric air. The coolant water of the first reservoir 30 thus tends to incorporate foreign matter in the atmospheric air. However, in the present embodiment, the opening of the communicating portion 90 in the second air retaining portion 60b is located higher than the maximum water level SU of the first liquid retaining portion 30a. The coolant water of the first reservoir 30 in the communicating portion 90 is thus unlikely to flow into the second reservoir 60. Therefore, even though the section of the communicating portion 90 in the vicinity of the opening is filled with the coolant water of the first reservoir 30, which tends to incorporate foreign matter in the atmospheric air, the coolant water of the first reservoir 30 is unlikely to enter the second reservoir 60.

(2) The greater the cross-sectional area of a coolant water passage, the smaller becomes the ascent amount of the coolant water surface in the coolant water passage. In the present embodiment, the compartment 92 is provided in the first reservoir 30, with the passage of the compartment 92 configuring a section of the communicating portion 90. Further, the cross-sectional area of the compartment 92 is greater than the cross-sectional area of the communication pipe 91. This decreases the ascent amount of the coolant water surface in the compartment 92 compared to a case in which the cross-sectional area of the compartment 92 is smaller than or equal to the cross-sectional area of the communication pipe 91. Therefore, even when the coolant water surface ascends in the compartment 92, the coolant water in the compartment 92 is unlikely to flow into the communication pipe 91. This also makes it further unlikely that the coolant water ins the first reservoir 30, which tends to incorporate foreign matter in the atmospheric air, will flow into the second reservoir 60 through the communicating portion 90.

(3) The electric second water pump 65 is arranged in the second cooling circuit 200. If foreign matter in the atmospheric air is incorporated by the coolant water of the second cooling circuit 200, foreign matter may bite into or adhere to a bearing portion of the second water pump 65. This increases rotation resistance of the bearing portion, which may increase the electric power consumed by the second water pump 65. However, the cooling apparatus of the present embodiment is capable of restraining incorporation of foreign matter in the atmospheric air in the coolant water of the second cooling circuit 200. This restrains increase of the electric power consumed by the second water pump 65 caused by biting or adhesion of foreign matter with respect to the bearing portion. Also, incorporation of foreign matter in the coolant water of the second cooling circuit 200 is hampered. This simplifies a sealing structure for preventing biting or adhesion of foreign matter with respect to the bearing portion of the second water pump 65 or allows omitting of the sealing structure as a whole.

The present embodiment may be modified as follows. Also, two or more of the following modifications may be combined as necessary.

Although the partition wall 39 is connected to both the second side wall 36B and the third side wall 36C as illustrated in FIG. 3, the partition wall 39 may be connected to any side wall other than the second and third side walls 36B and 36C. Such modifications will hereafter be described.

Figure 8:
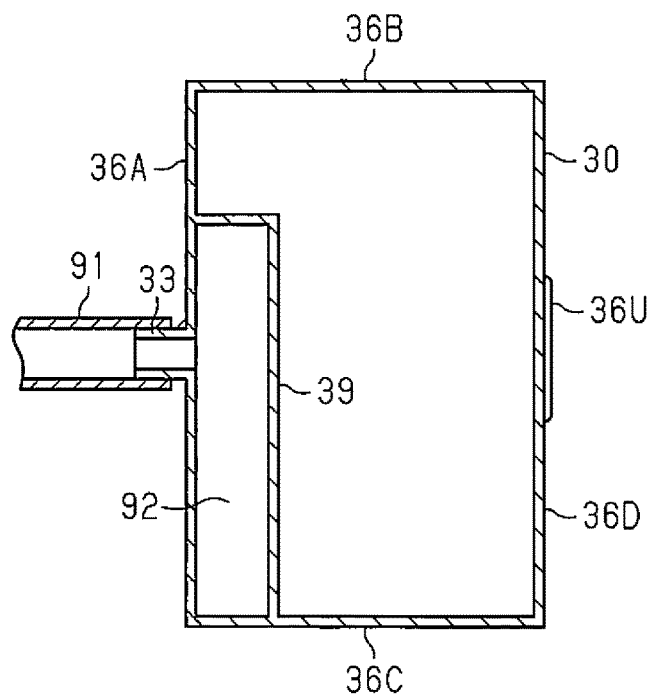
FIG. 8 is a cross-sectional view of the first reservoir including a partition wall of a modification.

With reference to FIG. 8, one of opposite end surfaces of the partition wall 39, which extends along the first side wall 36A, may be connected to the third side wall 36C, and the other one of the end surfaces may be bent toward the first side wall 36A and connected to the first side wall 36A.

Figure 9:
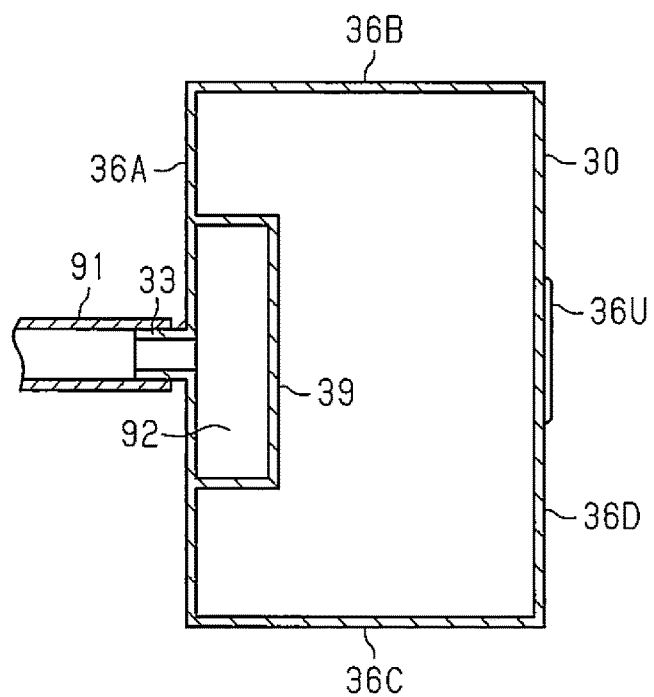
FIG. 9 is a cross-sectional view of the first reservoir including a partition wall of another modification.

As shown in FIG. 9, the opposite ends of the partition wall 39, which extends along the first side wall 36A, may be bent toward the first side wall 36A and connected to the first side wall 36A.

By arranging the partition wall 39 in the first reservoir 30, the compartment 92 and the communicating portion 90 are provided. However, the structure of the communicating portion 90 may be modified as needed.

Figure 10:
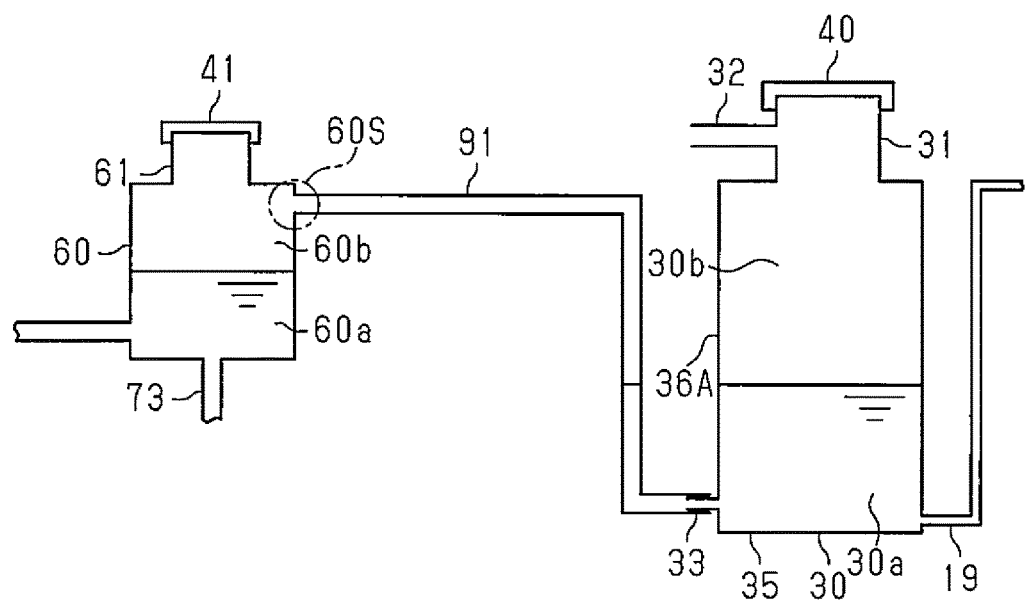
FIG. 10 is a diagram illustrating the configuration of a cooling apparatus of a modification.

With reference to FIG. 10, the partition wall 39 in the first reservoir 30 may be omitted. Alternatively, the position of the connecting portion 33 may be changed to a position on the first side wall 36A lower than the minimum water level SL of the first liquid retaining portion 30a, which is, for example, in the vicinity of the bottom wall 35, thus allowing communication between the connecting portion 33 and the first liquid retaining portion 30a.

In this modification, the passage end section 60S of the communication pipe 91, which is connected to the second reservoir 60, is arranged higher than the maximum water level SU of the first liquid retaining portion 30a. The communication pipe 91, which is connected to the second reservoir 60, is connected to the connecting portion 33 in the vicinity of the bottom wall 35. In this case, the communication pipe 91, which connects the second air retaining portion 60b and the first liquid retaining portion 30a directly to each other, configures the communicating portion 90. In this modification, the opening of the communicating portion 90 in the first liquid retaining portion 30a is also arranged lower than the minimum water level SL of the first liquid retaining portion 30a. Further, the opening of the communicating portion 90 in the second air retaining portion. 60b is arranged higher than the maximum water level SU of the first liquid retaining portion 30a. As a result, advantages similar to the advantages (1) and (3) of the present embodiment are obtained.

Figure 11:
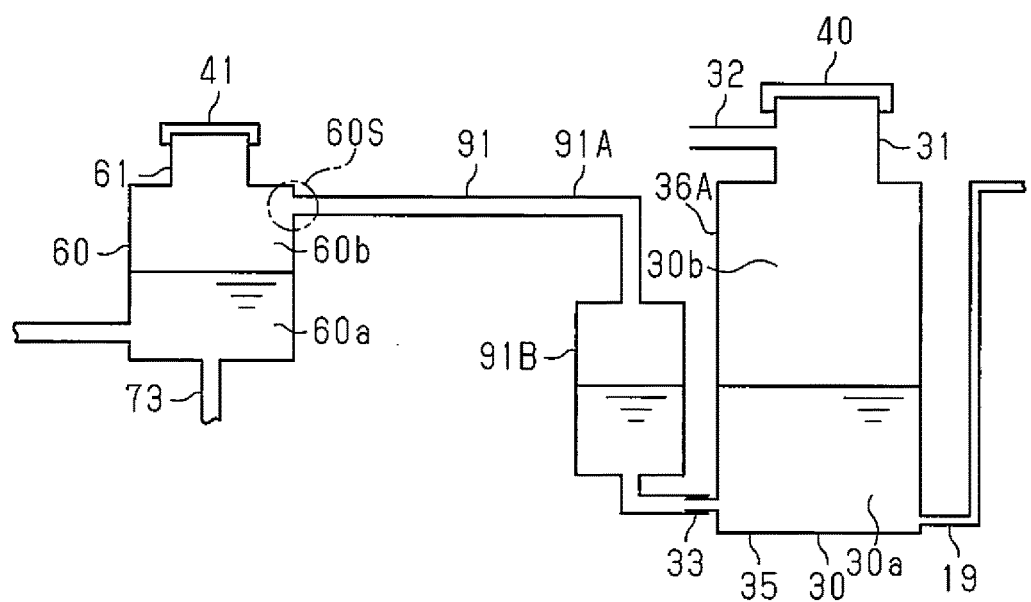
FIG. 11 is a diagram illustrating the configuration of a cooling apparatus of another modification.

As illustrated in FIG. 11, a large diameter portion 91B, which has a greater cross-sectional area than a general portion 91A of the communication pipe 91, may be arranged in a specific section of the communication pipe 91 shown in FIG. 10. In this case, the position of the large diameter portion 91B in the communication pipe 91 is set such that the coolant water surface in the communication pipe 91 is located in the large diameter portion 91B. In this modification, the cross-sectional area of the large diameter portion 91B is greater than that of the general portion 91A of the communication pipe 91. The ascent amount of the coolant water surface in the communication pipe 91 is small compared to that of the communication pipe 91 that lacks the large diameter portion 91B. This restrains flow of the coolant water in the communication pipe 91 into the second reservoir 60 caused by ascent of the coolant water surface in the communication pipe 91. As a result, the coolant water in the first reservoir 30, which tends to incorporate foreign matter in the atmospheric air, is further unlikely to flow into the second reservoir 60 through the communication pipe 91.

The second water pump 65 may be a mechanically driven pump like the first water pump 18. Also in this case, the advantages other than the advantage (2) are obtained.

The first water pump 18 may be changed to an electric pump.

The first reservoir 30 has the upper limit mark 36U, which represents the maximum water level SU of the first liquid retaining portion 30a, and the lower limit mark 36L, which represents the minimum water level SL of the first liquid retaining portion 30a. However, the first reservoir 30 does not necessarily have to have the upper or lower limit mark 36U, 36L. In a case without the upper or lower limit mark 36U, 36L, the water level considered to be the upper limit of the retaining amount of coolant water in the first reservoir 30 by those skilled in the art may be defined as the maximum water level SU and the water level considered to be the lower limit of the retaining amount of coolant water in the first reservoir 30 may be defined as the minimum water level SL.

Although the second cooling circuit 200 cools the transaxle 66 and the inverter 68, cooling targets may be changed as needed. For example, the second cooling circuit 200 may cool an electric circuit other than the inverter or a motor serving as a drive source.

Although the vehicle employing the cooling apparatus 10 is a hybrid vehicle, the vehicle may be a vehicle including a motor as a sole drive source. In this case, a structure generating a greater amount of heat than the transaxle 66 or the inverter 68 may be cooled by the first cooling circuit 100. Also, if the cooling apparatus 10 is mounted in a vehicle only including an internal combustion engine, a structure generating a less amount of heat than the internal combustion engine 15, such as an intercooler for cooling air supplied by a super induction device or an EGR cooler for cooling exhaust gas returned to intake air, may be cooled by the second cooling circuit 200.

The cooling apparatus 10 of the vehicle may include three or more cooling circuits. If the cooling apparatus 10 includes three cooling circuits, which are the first cooling circuit 100, the second cooling circuit 200, and a third cooling circuit, for example, a reservoir similar to the second reservoir 60 is arranged in the third cooling circuit. Also, communication between an air retaining portion of the reservoir in the third cooling circuit and the first liquid retaining portion 30a of the first reservoir 30 may be allowed in the same manner as in the present embodiment or any of its modifications. This also restrains incorporation of foreign matter in the atmospheric air by the second cooling circuit 200 and the third cooling circuit among the three cooling circuits.

The invention claimed is:

1. A cooling apparatus for a vehicle having a first cooling circuit and a second cooling circuit each allowing independent circulation of coolant water, the apparatus comprising:
   a first reservoir arranged in the first cooling circuit, wherein
      an interior of the first reservoir is open to atmospheric air, and
      a first liquid retaining portion that retains coolant water and a first air retaining portion arranged above the first liquid retaining portion are provided in the first reservoir,
   a second reservoir arranged in the second cooling circuit, wherein
      an interior of the second reservoir is sealed, and
      a second liquid retaining portion that retains the coolant water and a second air retaining portion arranged above the second liquid retaining portion are provided in the second reservoir; and
   a communicating portion that allows communication between the second air retaining portion and the first liquid retaining portion, wherein
   an opening of the communicating portion in the first liquid retaining portion is located lower than a minimum water level of the first liquid retaining portion, and
   an opening of the communicating portion in the second air retaining portion is located higher than a maximum water level of the first liquid retaining portion.

2. The cooling apparatus for a vehicle according to claim 1, wherein
   the communicating portion includes
      a partition wall that forms a compartment in the first reservoir, and
      a communication pipe that connects the first air retaining portion, which is located in an upper section of the compartment, to the second air retaining portion,
   the partition wall extends from an upper wall toward a bottom wall of the first reservoir,
   a lowermost end of the partition wall extends to a position that is lower than the minimum water level of the first liquid retaining portion and is spaced from the bottom wall,
   the compartment has a passage cross section parallel to a coolant water surface, and the compartment has a cross-sectional area greater than a cross-sectional area of the communication pipe.

3. The cooling apparatus for a vehicle according to claim 1, wherein the communicating portion includes a communication pipe connected directly to the second air retaining portion and the first liquid retaining portion.

4. The cooling apparatus for a vehicle according to claim 3, wherein the communication pipe has a general portion and a large diameter portion having a cross-sectional area greater than that of the general portion, and the position of the large diameter portion is set such that a coolant water surface in the communication pipe is located in the large diameter portion.

5. The cooling apparatus for a vehicle according to claim 1, wherein the second cooling circuit has an electric pump that circulates the coolant water.

* * * * *